United States Patent
Yu et al.

(10) Patent No.: US 11,310,878 B2
(45) Date of Patent: Apr. 19, 2022

(54) DIMMING CONTROL CIRCUIT, DRIVING DEVICE AND CONTROL METHOD THEREOF

(71) Applicant: Shanghai Bright Power Semiconductor Co., Ltd., Shanghai (CN)

(72) Inventors: Wei-Jia Yu, Shanghai (CN); Min-Min Fan, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/155,471

(22) Filed: Jan. 22, 2021

(65) Prior Publication Data

US 2021/0227655 A1    Jul. 22, 2021

(30) Foreign Application Priority Data

Jan. 22, 2020  (CN) .......................... 202010075645.7

(51) Int. Cl.
*H05B 45/14*    (2020.01)
*H05B 45/50*    (2020.01)
*H05B 45/325*   (2020.01)

(52) U.S. Cl.
CPC ........... *H05B 45/14* (2020.01); *H05B 45/325* (2020.01); *H05B 45/50* (2020.01)

(58) Field of Classification Search
CPC ........ H05B 45/00; H05B 45/10; H05B 45/14; H05B 45/325; H05B 45/50; H05B 47/00
See application file for complete search history.

(56) References Cited

U.S. PATENT DOCUMENTS

| | | | |
|---|---|---|---|
| 8,203,281 B2 | 6/2012 | Cegnar et al. | |
| 8,810,157 B2 | 8/2014 | Del Carmen, Jr. | |
| 8,928,236 B1 | 1/2015 | Mays, II et al. | |
| 9,820,343 B1 | 11/2017 | Fragiacomo et al. | |
| 2014/0091723 A1* | 4/2014 | Kuo .................. | H05B 45/14 315/200 R |

FOREIGN PATENT DOCUMENTS

CN           102196643 A       9/2011

* cited by examiner

*Primary Examiner* — Jimmy T Vu
(74) *Attorney, Agent, or Firm* — Muncy, Geissler, Olds & Lowe, PC

(57) ABSTRACT

A dimming control circuit, driving device and control method thereof, the dimming control circuit comprising a dimmer, a driving device coupled to the dimmer and controlling a load on the basis of a dimming level reference of the dimmer, and a bleeder supplying power to the dimmer, the driving device including a power switch coupled to the load, wherein a duty ratio of a driving voltage on the power switch is adjusted in accordance with the dimming level reference to control an operating current of the load.

19 Claims, 5 Drawing Sheets

DIMMING CONTROL CIRCUIT, DRIVING DEVICE AND CONTROL METHOD THEREOF

FIELD OF THE INVENTION

The disclosure relates to the field of electronic circuits, in particular to a dimming control circuit, a driving device thereof and a control method thereof.

BACKGROUND OF THE INVENTION

Light-emitting diode (LED) technology has been mature for many lighting applications. Compared with traditional incandescent light sources, light-emitting diode has the advantages of low energy consumption, fast switching, slim design and long service life. For the light-emitting diode product, the driving circuit is responsible for driving and controlling the light emission of the light-emitting diode, thereby playing an important function.

Among different driving approaches, the constant-current type and the constant-voltage type are mainly adopted at present. According to the current market trend, the constant-current type is still mainstream, and the constant-current type has the advantages of being low in cost, small in size. Related art can be found in U.S. Pat. Nos. 9,820,343, 8,928,236, 8,810,157, or 8,203,281, among others.

In the conventional constant-current driving technology, a closed-loop constant-current linear control architecture is favored by the market due to high reliability and accurate output. With reference to FIGS. 1 and 2, a schematic diagram of a known closed-loop constant-current linear light-emitting diode driving circuit architecture and a schematic diagram of a voltage-time waveform during operation of the circuit of FIG. 1 are shown, respectively. FIG. 1 includes a dimmer 91, a rectifier 92, a load 93, a bleeder 94, a power switch 95, a comparator 96, an integrator 97, and an amplifier 98. According to the circuit design of FIG. 1, as shown in FIG. 2, the load 93 is strings of light emitting diodes, wherein an average current is controlled by Vref, which is compared with the feedback signal Vcs flowing through the sampling resistor to generate Verror, which after passing through the integrator 97 generates a reference signal as input to the amplifier 98. In a steady state, when Vbus exceeds a voltage drop of the light string of the light-emitting diodes, Vcs follows the reference signal, which is proportional to a mean value of Vref, so that a mean value of Vcs is equal to the mean value of Vref, i.e. a magnitude of the mean value of Vcs is modulated by the mean value of Vref.

Therefore, in the prior closed-loop constant-current linear driving technology, an input terminal of the driving circuit is connected with the dimmer 91 (e.g. a TRIAC dimmer). Since the dimmer 91 needs sufficient current to maintain conduction, when the average value of the input current is relatively low, the current of the power switch 95 is insufficient to maintain conduction of the dimmer 91, and a bleeding current of the bleeder 94 needs to be increased to supplement the insufficient input current. As the input current decreases further, the bleeding current correspondingly needs to be increased further. Therefore, the power generated by the increase of the bleeding current is finally converted into heat, so that the whole system consumes more energy, the heat dissipation cost is increased, and the system reliability is lowered.

SUMMARY OF THE INVENTION

The disclosure mainly aims to solve the problems of system energy consumption, heat dissipation cost increase and reliability reduction caused by the increase of bleeding current in the known closed-loop constant-current linearly controlled light-emitting diode driving circuit.

To achieve the object, the present disclosure provides a driving device utilized in a dimming control circuit for driving a load, the driving device configured to receive an output of a rectifier, the rectifier configured to receive an AC power and to output a rectified DC output voltage to the load, wherein the driving device comprises: a power switch serially coupled to the load, configured to regulate a current flowing through the load; and a power switch control module, configured to generate a pulse width modulation signal to control the power switch on and off, wherein the pulse width modulation signal turns to an on-state state according to a conducting signal, the conducting signal being configured to indicate the rectified output voltage reaching a first reference, and wherein a duty ratio of the pulse width modulation signal is adjusted in accordance with an error between a sensed signal indicating a current flowing through the load and a dimming level reference.

In one or more embodiments, the power switch control module controls the power switch to regulate the current flowing through the load to a constant first predetermined value during the on-state of the pulse width modulation signal.

In one or more embodiments, wherein the load and the power switch comprises a driving branch circuit, and wherein the driving device further comprising a bleeder, parallelly coupled to the driving branch circuit.

In one or more embodiments, the driving device further comprises a comparison module, the comparison module comprising a first comparison unit and a second comparison unit, the first comparison unit sensing the output voltage and generating the conduction signal on the basis of a first comparison result between a first reference signal corresponding to the first reference and a sensed output voltage, the second comparison unit generating an off signal to determine the duty ratio of the pulse width modulation signal on the basis of a second comparison result between an integral reference associated with the error and a timing signal; and a pulse width modulation signal generator, receiving the conduction signal and the second comparison result, operable to generate the pulse width modulation signal accordingly.

In one or more embodiments, the first comparison unit comprises a first comparator receiving the output voltage and the first reference signal and a trigger coupled to the first comparator.

In one or more embodiments, the second comparison unit comprises a first arithmetic circuit coupled to the pulse width modulation signal generator, the first arithmetic circuit receiving the integral reference and the timing signal, and wherein the second comparison unit outputs the off signal when the integral reference is equal to the timing signal.

In one or more embodiments, the second comparison unit further comprises an integrator coupled to the first arithmetic circuit, receiving the error and operable to output the integral reference accordingly; and a second arithmetic circuit, coupled to the integrator, the second arithmetic circuit, receiving the sensed signal and the dimming level reference, operable to output the error.

In one or more embodiments, the error is a difference between the sensed signal and the dimming level reference.

In one or more embodiments, the second comparison unit further comprises: a timer coupled to the first arithmetic circuit, operable to output the timing signal to the first arithmetic circuit; and a second comparator coupled to the timer, the second comparator generating a reset signal to reset the timer if the rectified DC output voltage is below a second predetermined value.

In one or more embodiments, the second comparison unit further comprises: a timer coupled to the first arithmetic circuit, operable to output the timing signal to the first arithmetic circuit; and a second comparator coupled to the timer, the second comparator generating a reset signal to reset the timer if the sensed signal is below a third predetermined value.

In one or more embodiments, the pulse width modulation signal generator comprises: an amplifier coupled to the power switch, wherein the amplifier receives the sensed signal and a first predetermined value, operable to generate the pulse width modulation signal; and an enabling unit coupled to the amplifying unit, and wherein the enabling unit determines whether to enable the amplifying unit according to the conduction signal and the off signal.

To achieve the object, the present disclosure also provides a dimming control circuit, comprising a dimmer, a driving device as described above, and a bleeder supplying power to the dimmer, the driving device being coupled to the dimmer and controlling a load and a bleeder for supplying power to the dimmer on the basis of a dimming signal.

In order to achieve the object, the disclosure further provides a dimming control method used for a dimming control circuit, the dimming control circuit comprising a dimmer, a rectifier, a driving device and a bleeder, the rectifier being coupled to the dimmer and configured to receive an AC power and to output a rectified DC output voltage to a load, the driving device comprising a power switch coupled to the load and a pulse width modulation signal generator, the power switch controlling the load on the basis of a dimming signal, the bleeder supplying power to the dimmer, wherein the method comprises the following steps: receiving a conduction signal based on the rectified DC output voltage and a off signal based on the dimming signal by the pulse width modulation signal generator; and outputting a pulse width modulation signal to the power switch on the basis of the conduction signal and the off signal, wherein a duty ratio of the pulse width modulation signal is adjusted in accordance with an error between a sensed signal indicating a current flowing through the load and a dimming level reference.

In one or more embodiments, the conduction signal is generated when the rectified DC output voltage reaches a first reference signal.

In one or more embodiments, a second comparison result between an integral reference associated with the error and a timing signal is obtained to generate the off signal, a first arithmetic circuit receiving the integral reference and the timing signal, the off signal being generated when the integral reference is equal to the timing signal.

In one or more embodiments, the integral reference is based on integrating the error between the sensed signal indicating the current flowing through the load and the dimming level reference.

In one or more embodiments, the error is a difference between the sensed signal and the dimming level reference.

In one or more embodiments, generating the timing signal comprises the step of: comparing the sensed signal with a second reference signal, and outputting the timing signal when the sensed signal is less than the second reference signal.

In one or more embodiments, generating the timing signal comprises the step of: comparing the rectified DC output voltage with a second reference signal, and outputting the timing signal when the sensed signal is less than the second reference signal.

Instead of adjusting the amplitude of the pulse width modulation signal as is known in the art, the present disclosure uses feedback to control the power switch to adjust the duty ratio of the pulse width modulation signal used to drive the gate terminal of the power switch on the basis of the dimming signal. Therefore, according to the technology of the disclosure, when the input current of the dimming signal is reduced, the bleeding current is not required to be increased, so that the purposes of reducing power consumption, reducing temperature rise and improving reliability are achieved.

DETAILED DESCRIPTION OF THE PREFERRED EMBODIMENTS

With respect to the detailed description and technical content of the present disclosure, reference is now made to the following description taken in conjunction with the accompanying drawings.

Figure 1:
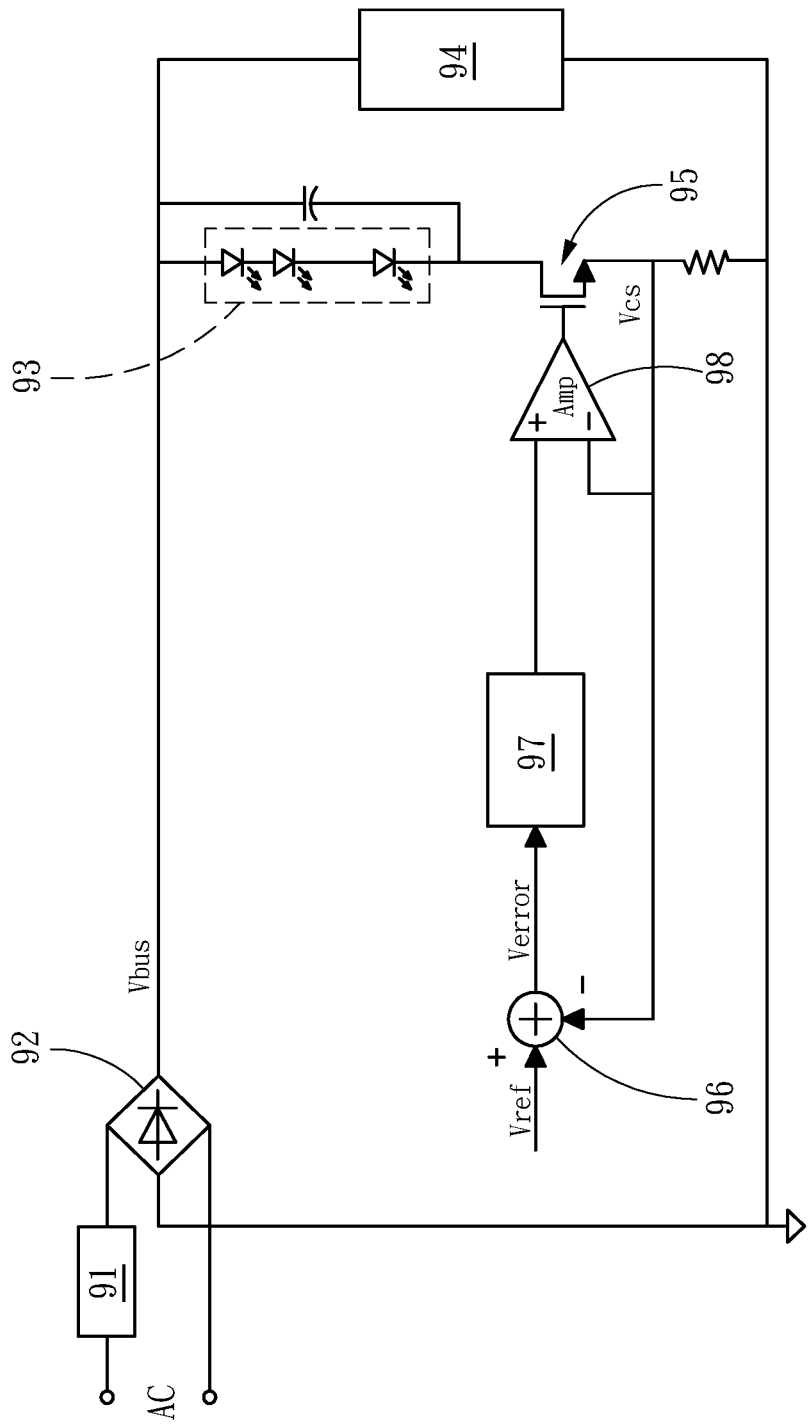
FIG. 1 is a schematic diagram of a known closed-loop constant-current linear light-emitting diode driving circuit architecture.
Figure 2:
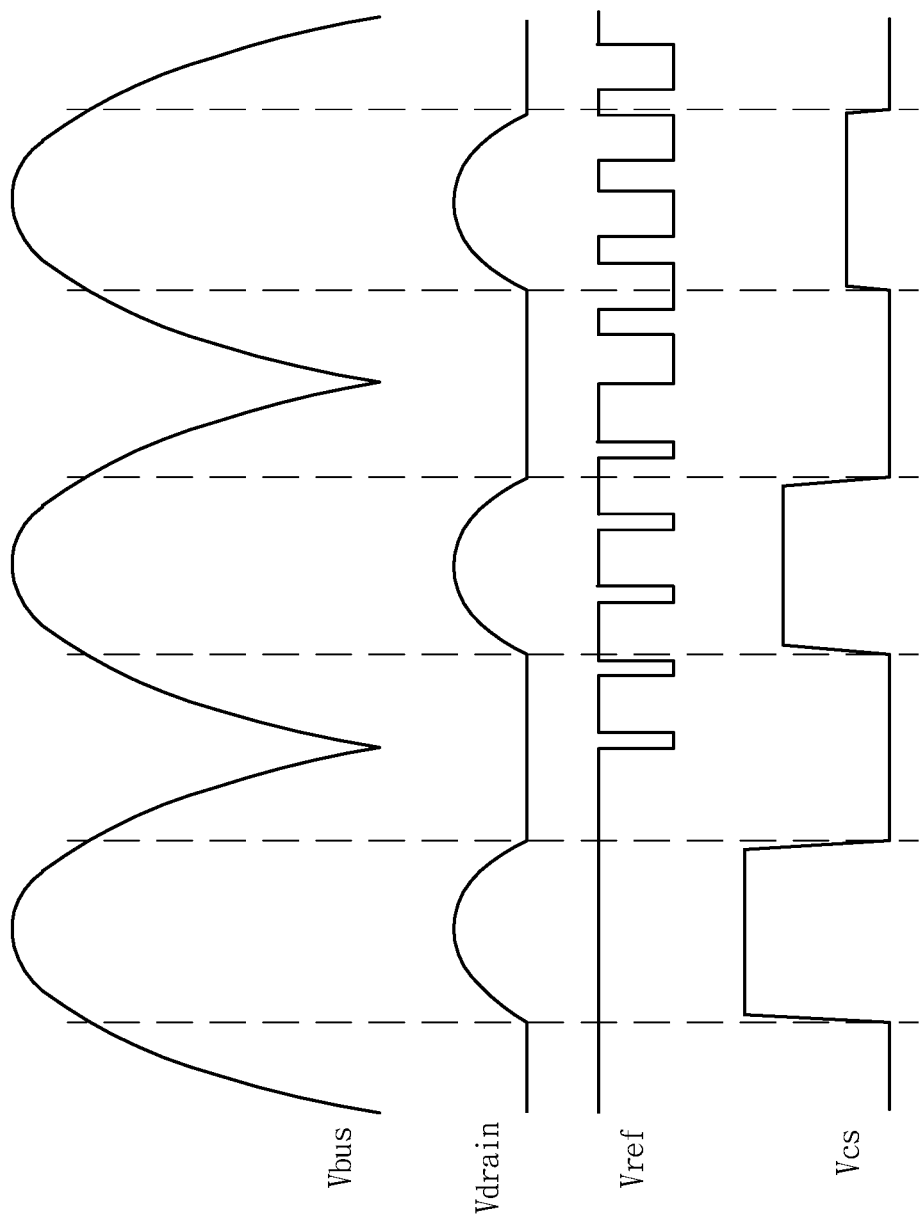
FIG. 2 is a schematic diagram of a voltage-time waveform during operation of the circuit of FIG. 1.
Figure 3:
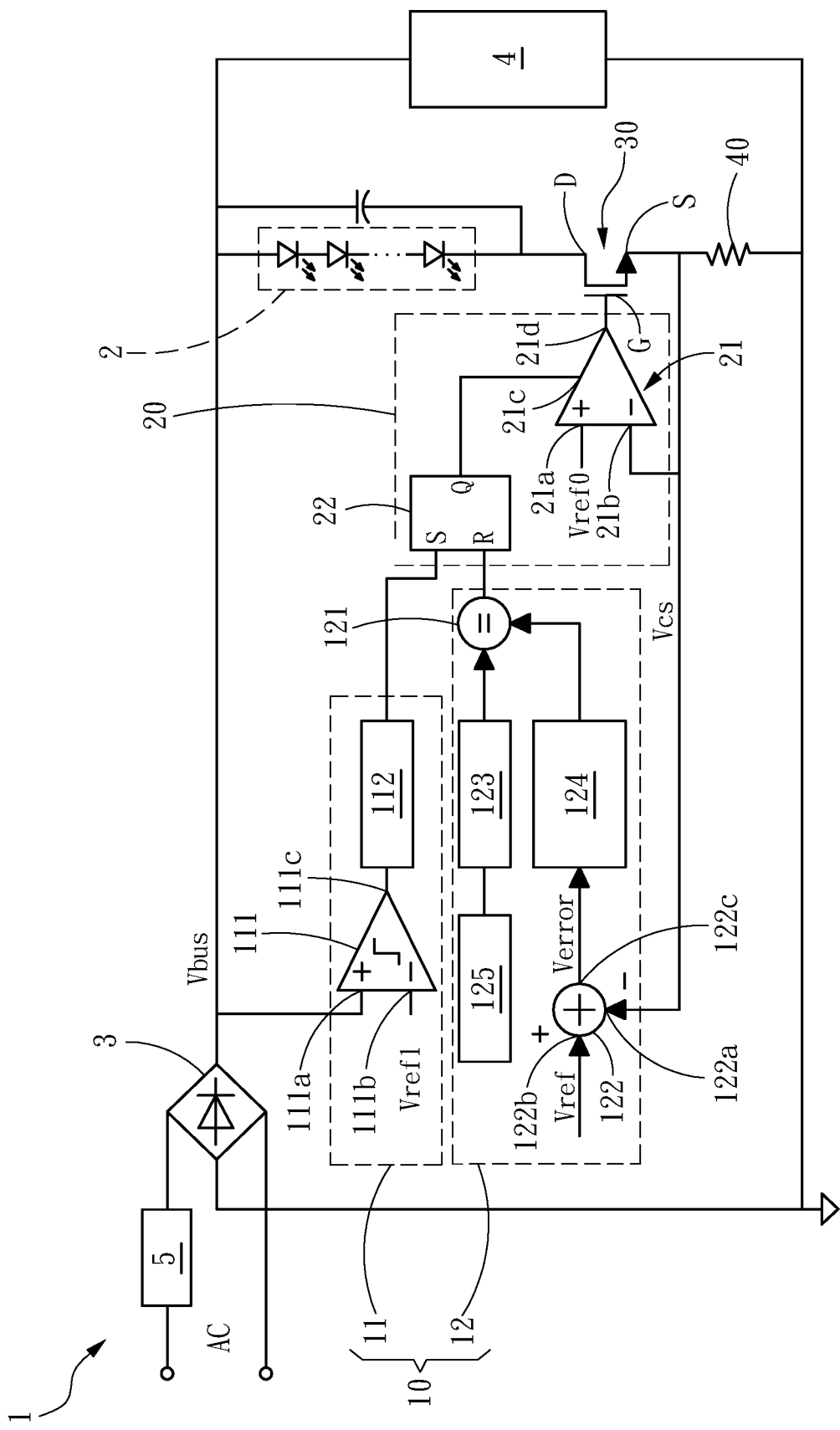
FIG. 3 is a schematic diagram of a light-emitting diode driving circuit architecture according to an embodiment of the present disclosure.

The disclosure discloses a dimming control circuit, a driving device and a control method thereof, which are applied to light-emitting diodes, wherein the dimming control circuit adopts a closed-loop constant-current linear control framework. With reference to FIG. 3, which is a schematic diagram of the circuit architecture of an embodiment of the present disclosure, there is disclosed a dimming control circuit comprising a driving device 1, a bleeder 4 and a dimmer 5, the driving device 1 being coupled to the dimmer 5 and controlling a load 2 on the basis of a dimming level reference, the driving device 1 comprising a power switch 30 serially coupled to the load 2. A duty ratio of a driving voltage on the power switch 30 in the dimming control circuit is adjusted in accordance with the dimming level reference to control an operating current of the load 2 for an operating state of the load 2 to reflect the dimming level.

A further description will be made to the driving device of the dimming control circuit disclosed by the present disclosure, wherein the driving device 1 is used for driving the load 2 and is connected between a rectifier 3 and a bleeder 4, an input side of the rectifier 3 is coupled with a dimmer 5, and the bleeder 4 supplies power to the dimmer 5. The rectifier 3 receives an alternating current AC and outputs a rectified DC output voltage Vbus, i.e. the bus voltage, to the load 2. The driving device 1 comprises a comparison module 10, a pulse width modulation signal generator 20 and the power switch 30, the comparison module 10 comprising a first comparison unit 11 and a second comparison unit 12. The power switch 30 can be a power switch such as a metal oxide semiconductor field-effect transistor (MOSFET) and comprises a drain terminal D, a source terminal S and a gate terminal G, wherein the drain terminal D is coupled to the load 2, the source terminal S is coupled to a resistor R, and the gate terminal G is coupled to the pulse width modulation signal generator 20. The coupling of two or more electrical or electronic elements described herein may be a direct electrical connection between elements, or an electrical connection formed with another element between elements.

The first comparison unit 11 comprises a first comparator 111 and a trigger 112, wherein the first comparator 111 comprises a first input terminal 111*a*, a second input terminal 111*b* and an output terminal 111*c*, the first input terminal 111*a* is coupled to the output voltage Vbus, and the second input terminal 111*b* inputs a first reference signal Vref1. The first comparator 111 compares the output voltage Vbus with the first reference signal Vref1 to generate a first comparison result, generates a conduction signal according to the first comparison result, specifically generates the conduction signal when the output voltage Vbus reaches the first reference signal Vref1, and inputs the conduction signal to the pulse width modulation signal generator 20.

The second comparison unit 12 comprises a first arithmetic circuit 121, a second arithmetic circuit 122, a timer 123, an integrator 124, and a second comparator 125. The second comparator 125 is coupled to the timer 123, the second comparator 125 outputs a signal to the timer 123 after a certain condition is met, and the timer 123 is coupled to the first arithmetic circuit 121. In the embodiment, the second comparator 125 can be utilized as a reset circuit, wherein the reset circuit is used for generating a reset signal with a frequency equaling to line frequency. When the output of the reset signal is valid, the timer 123 is reset, and vice versa, i.e. when the output of the reset signal is invalid, the timer 123 starts timing and outputs a timing signal.

For example, the reset signal can be generated by comparing the output voltage Vbus with a second reference signal, and the reset signal is generated when the output voltage Vbus is less than a second predetermined value. Alternatively, the reset signal can be generated by comparing a sensed signal Vcs indicating a current flowing through the power switch 30 with the second reference signal, and the reset signal may be generated when the sensed signal Vcs is less than a third predetermined value. In this embodiment, the sensed signal is a sampling voltage that indicates a current flowing through the power switch 30 by a sampling resistor 40.

The second arithmetic circuit 122 comprises a first input terminal 122*a*, a second input terminal 122*b*, and an output terminal 122*c*. The second arithmetic circuit 122 inputs a sensed signal Vcs flowing through the power switch 30 and dimming level reference Vref and generate an error Verror. The error Verror is send to the integrator 124 to obtain an integral result as an integral reference. In this embodiment, the first input terminal 122*a* receives the sensed signal Vcs flowing through the power switch 30 between the source terminal S of the power switch 30 and the resistor R, and the second input terminal 122*b* receives the dimming level reference Vref, which may be a direct current level, a pulse width modulation (PWM) signal or a filtered signal of the pulse width modulation signal. In this embodiment, the second arithmetic circuit 122 outputs a difference value Verror as the error by subtracting the sensed signal Vcs from the dimming level reference Vref, the difference value Verror being transmitted to the integrator 124 for integration, the integrator 124 integrating the difference value Verror and outputting the integral reference. The integral reference and the timing signal are input to the first arithmetic circuit 121, and when the first time signal is equal to the second time signal, the first arithmetic circuit 121 outputs an off signal to the pulse width modulation signal generator 20.

The pulse width modulation signal generator 20 comprises an amplifier 21 coupled to the power switch 30, and an enabling unit 22. In this embodiment, the amplifier 21 having a first input terminal 21*a* receiving a reference signal Vref0 indicating a first reference value, a second input terminal 21*b* receiving the sensed signal Vcs, a positive power supply 21*c* coupled to the enabling unit 22, and an output terminal 21*d* coupled to the gate terminal G of the power switch 30. In this embodiment, the enabling unit 22 is a flip-flop having a reset terminal R coupled to the first arithmetic circuit 121 of the second comparison unit 12, a setting terminal S coupled to the trigger 112 of the first comparator 111, and an output terminal Q coupled to the positive power supply 21*c* of the amplifier. The reset terminal R of the enabling unit 22 receives the off signal, and the setting terminal S of the enabling unit 22 receives the conduction signal and determines whether to output an enabling signal to the positive power supply 21*c* of the amplifier according to the conduction signal and the off signal so as to drive the amplifier. Thus, the amplifier outputs a pulse width modulation (PWM) signal to the gate terminal G of the power switch 30, wherein a duty ratio of the pulse width modulation signal is adjusted in accordance with the dimming level reference to control an operating state of the load 2.

Figure 4:
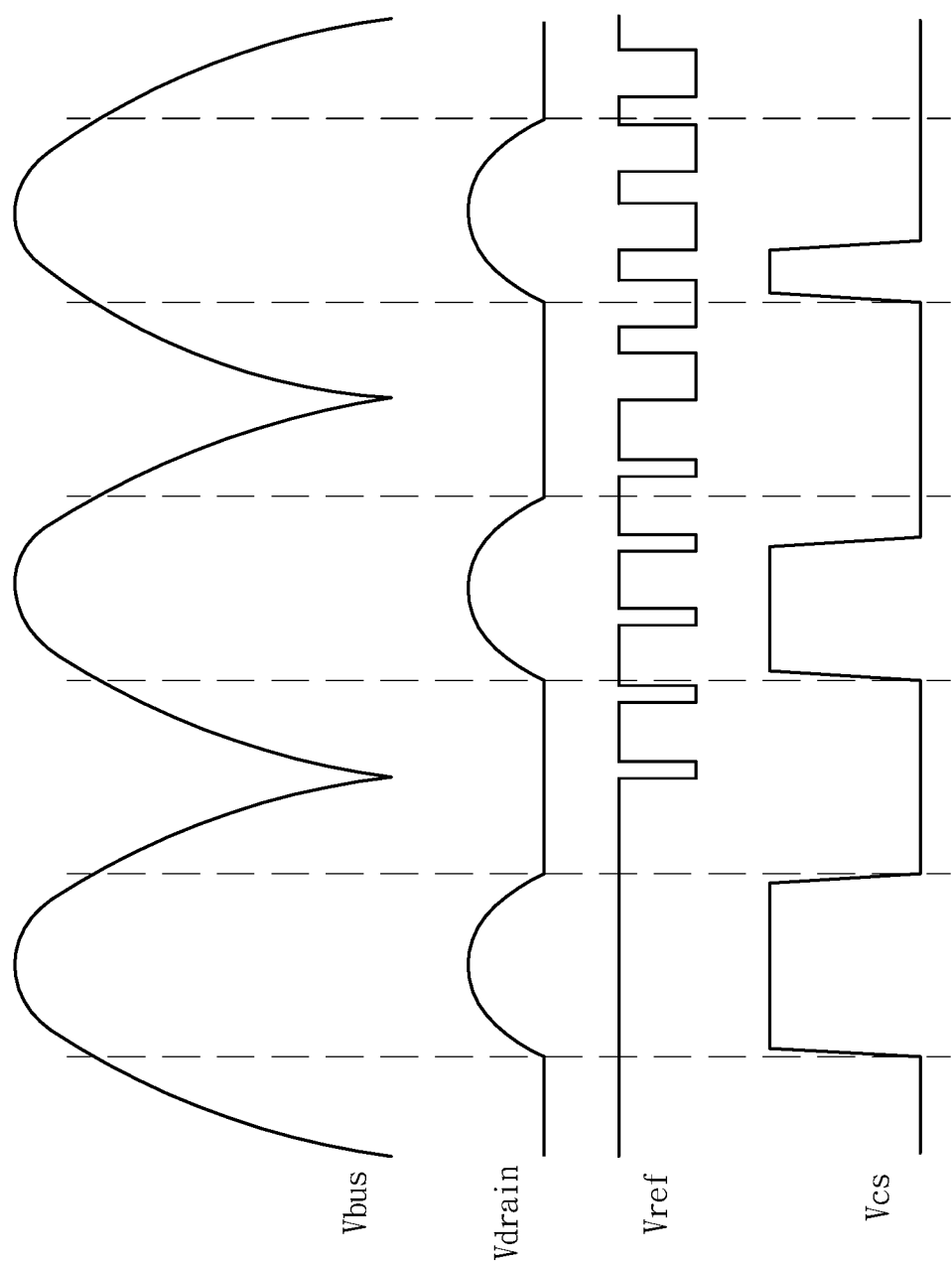
FIG. 4 is a schematic diagram of a voltage-time waveform during operation of the circuit of FIG. 3.

With reference to FIG. 4, a schematic diagram of a voltage-time waveform during operation of the circuit of FIG. 3 is shown. In FIG. 4, Vcs reflects a current flowing through the power switch 30, i.e. through the load since the load and the power switch 30 are serially coupled, and it can be seen from FIG. 4 that the dimming control circuit adjusts the duty ratio of current flowing through the power switch 30 by the pulse width modulation signal driving the gate terminal of the power switch in accordance with the technique of the present disclosure, i.e. the dimming level reference, rather than adjusting the amplitude of the current flowing through the power switch by adjusting the amplitude of a gate driving signal on the gate terminal of the power switch as is known in the art. Therefore, according to the technology of the disclosure, when the dimming level reference is reduced, the bleeding current on bleeder is not required to be increased, so that the purposes of reducing power consumption, reducing temperature rise and improving reliability are achieved.

Figure 5:
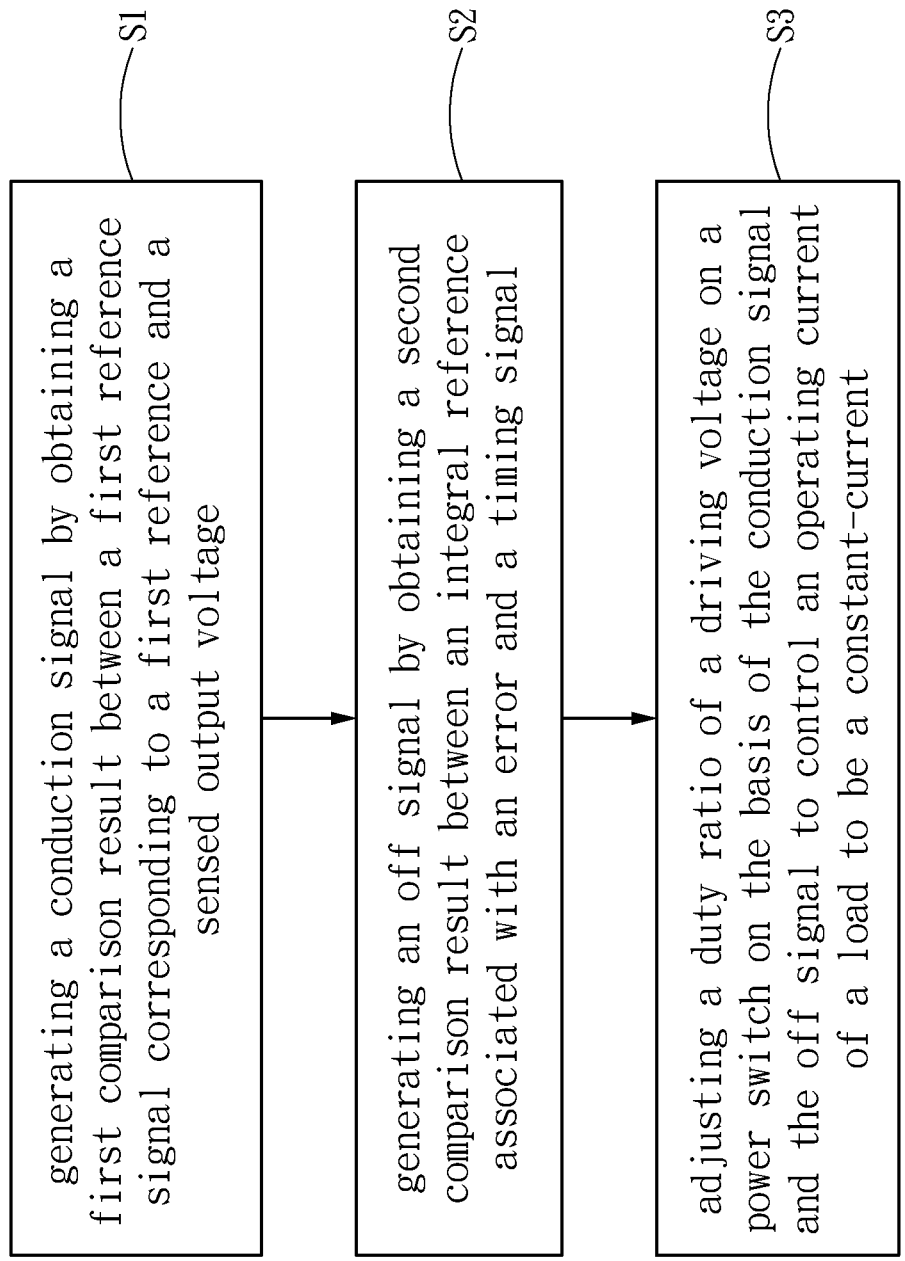
FIG. 5 illustrates a dimming control method according to an embodiment of the present disclosure.

In another aspect, the present disclosure also provides a dimming control method used in a dimming control circuit. In some embodiments, the dimming control method can be applied to the dimming control circuit of FIG. 3, including the driving device 1, the rectifier 3, the bleeder 4, and the dimmer 5. The rectifier 3 is coupled to the dimmer 5 and is configured to receive an AC power to output a rectified DC output voltage Vbus to the load 2, and the driving device 1 comprises the power switch 30 which controls the load 2 on the basis of a dimming signal. With reference to FIG. 5, the method comprises the following steps:

step 1: generating the conduction signal by obtaining a first comparison result between the first reference signal corresponding to the first reference and the sensed output voltage.

step 2: generating the off signal by obtaining a second comparison result between the integral reference associated with the error and the timing signal.

Step 3: adjusting the duty ratio of a driving voltage on the power switch 30 on the basis of the conduction signal and the off signal in accordance with the dimming signal to control an operating current of the load 2.

What is claimed is:

1. A driving device utilized in a dimming control circuit for driving a load, the driving device configured to receive an output of a rectifier, the rectifier configured to receive an AC power and to output a rectified DC output voltage to the load, wherein the driving device comprises:
   a power switch serially coupled to the load, configured to regulate a current flowing through the load; and
   a power switch control module, configured to generate a pulse width modulation signal to control the power switch on and off, wherein the pulse width modulation signal turns to an on-state state according to a conducting signal, the conducting signal being configured to indicate the rectified output voltage reaching a first reference, and wherein a duty ratio of the pulse width modulation signal is adjusted in accordance with an error between a sensed signal indicating a current flowing through the load and a dimming level reference.

2. The driving device according to claim 1, wherein the power switch control module controls the power switch to regulate the current flowing through the load to a constant first predetermined value during the on-state of the pulse width modulation signal.

3. The driving device according to claim 1, wherein the load and the power switch comprises a driving branch circuit, and wherein the driving device further comprising a bleeder, parallelly coupled to the driving branch circuit.

4. The driving device according to claim 1, comprising:
   a comparison module, the comparison module comprising a first comparison unit and a second comparison unit, the first comparison unit sensing the output voltage and generating the conduction signal on the basis of a first comparison result between a first reference signal corresponding to the first reference and a sensed output voltage, the second comparison unit generating an off signal to determine the duty ratio of the pulse width modulation signal on the basis of a second comparison result between an integral reference associated with the error and a timing signal; and
   a pulse width modulation signal generator, receiving the conduction signal and the second comparison result, operable to generate the pulse width modulation signal accordingly.

5. The driving device according to claim 4, wherein the first comparison unit comprises a first comparator receiving the sensed output voltage and the first reference signal and a trigger coupled to the first comparator.

6. The driving device according to claim 4, wherein the second comparison unit comprises a first arithmetic circuit coupled to the pulse width modulation signal generator, the first arithmetic circuit receiving the integral reference and the timing signal, and wherein the second comparison unit outputs the off signal when the integral reference is equal to the timing signal.

7. The driving device according to claim 6, wherein the second comparison unit further comprises:
   an integrator coupled to the first arithmetic circuit, receiving the error and operable to output the integral reference accordingly; and
   a second arithmetic circuit, coupled to the integrator, the second arithmetic circuit, receiving the sensed signal and the dimming level reference, operable to output the error.

8. The driving device according to claim 6, wherein the error is a difference between the sensed signal and the dimming level reference.

9. The driving device according to claim 6, wherein the second comparison unit further comprises:
   a timer coupled to the first arithmetic circuit, operable to output the timing signal to the first arithmetic circuit; and
   a second comparator coupled to the timer, the second comparator generating a reset signal to reset the timer if the rectified DC output voltage is below a second predetermined value.

10. The driving device according to claim 6, wherein the second comparison unit further comprises:
    a timer coupled to the first arithmetic circuit, operable to output the timing signal to the first arithmetic circuit; and
    a second comparator coupled to the timer, the second comparator generating a reset signal to reset the timer if the sensed signal is below a third predetermined value.

11. The driving device according to claim 4, wherein the pulse width modulation signal generator comprises:
    an amplifier coupled to the power switch, wherein the amplifier receives the sensed signal and a first predetermined value, operable to generate the pulse width modulation signal; and
    an enabling unit coupled to the amplifier, and wherein the enabling unit determines whether to enable the amplifier according to the conduction signal and the off signal .

12. A dimming control circuit, comprising a dimmer, a driving device according to claim 1 coupled to the dimmer and controlling a load and a bleeder for supplying power to the dimmer on the basis of a dimming signal.

13. A dimming control method used for a dimming control circuit, the dimming control circuit comprising a dimmer, a rectifier, a driving device and a bleeder, the rectifier being coupled to the dimmer and configured to receive an AC power and to output a rectified DC output voltage to a load, the driving device comprising a power switch coupled to the load and a pulse width modulation signal generator, the power switch controlling the load on the basis of a dimming signal, the bleeder supplying power to the dimmer, wherein the method comprises the following steps:
    receiving a conduction signal based on the rectified DC output voltage and a off signal based on the dimming signal by the pulse width modulation signal generator; and
    outputting a pulse width modulation signal to the power switch on the basis of the conduction signal and the off signal, wherein a duty ratio of the pulse width modulation signal is adjusted in accordance with an error between a sensed signal indicating a current flowing through the load and a dimming level reference.

14. The dimming control method according to claim 13, wherein the conduction signal is generated when the rectified DC output voltage reaches a first reference signal.

15. The dimming control method according to claim 13, wherein a second comparison result between an integral reference associated with the error and a timing signal is obtained to generate the off signal, a first arithmetic circuit receiving the integral reference and the timing signal, the off signal being generated when the integral reference is equal to the timing signal.

16. The dimming control method according to claim 15, wherein the integral reference is based on integrating the error between the sensed signal indicating the current flowing through the load and the dimming level reference.

17. The dimming control method according to claim 16, wherein the error is a difference between the sensed signal and the dimming level reference.

18. The dimming control method according to claim 15, wherein generating the timing signal comprises the step of:
   comparing the sensed signal with a second reference signal, and outputting the timing signal when the sensed signal is less than the second reference signal.

19. The dimming control method according to claim 15, wherein generating the timing signal comprises the step of:
   comparing the rectified DC output voltage with a second reference signal, and outputting the timing signal when the sensed signal is less than the second reference signal.

* * * * *